R. C. SHOCKLEY.
Improvement in Wagon-Brakes.

No. 114,054.                  Patented April 25, 1871.

United States Patent Office.

RICHARD C. SHOCKLEY, OF FAYETTE, WISCONSIN.

Letters Patent No. 114,054, dated April 25, 1871.

IMPROVEMENT IN WAGON-BRAKES.

The Schedule referred to in these Letters Patent and making part of the same.

*To all whom it may concern:*

Be it known that I, RICHARD C. SHOCKLEY, of Fayette, in the county of La Fayette and State of Wisconsin, have invented a new and improved Wagon-Brake; and I do hereby declare that the following is a full, clear, and exact description of the same, reference being had to the accompanying drawing forming a part of this specification, in which—

Figure 1:
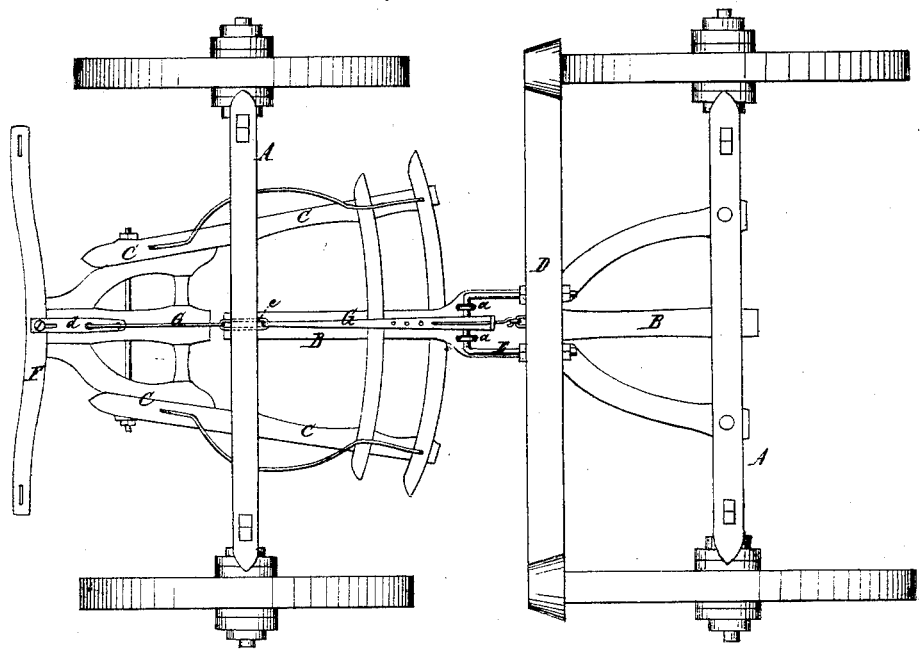
Figure 2:
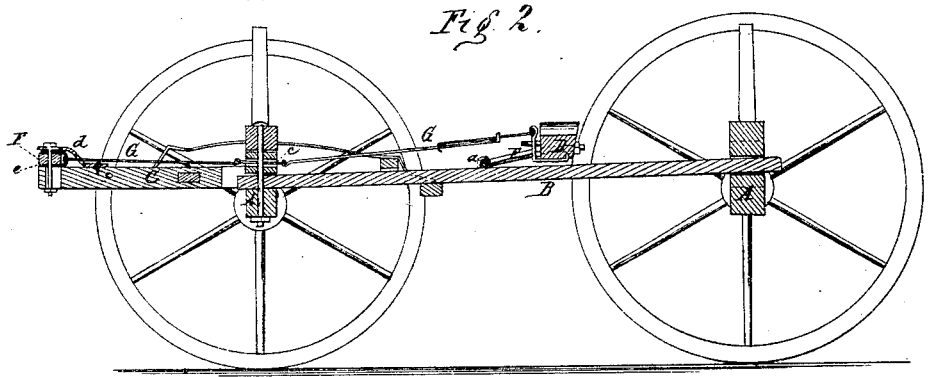

Figure 1 is a plan view showing my improvements applied to the running-gear of a wagon, and Figure 2 a sectional side view of the same.

The object of my invention is to provide for public use a more simple, conveniently-applied, and efficient brake (of the class denominated "automatic") than those heretofore known or used; and The invention consists in the method of hinging a brake-beam to the reach of a wagon and connecting the same with the draft-bar, so that, whenever the team ceases to pull, the brakes shall be brought into instant and forcible frictional contact with the rear wheels, and as quickly removed from them when the draft-force is again applied, as hereinafter described.

In the drawing—

A indicates the axles; B, the reach; and C, the hounds of a wagon; about the construction of which parts there is nothing new.

D represents a brake-beam, supported transversely on the reach and hinged to the same by means of a staple, E, and eye-bolts *a a*, the arms of said plate passing through the beam and being provided with screw-nuts or otherwise suitably fastened, and the eye-bolts being similarly connected with the reach.

The beam D is connected with the double-tree F by rods G, link *c*, and clevis *e e*.

The link *c* is so arranged that the king-bolt passes through it, and a slot or elongated opening is formed in the hammer-strap *d* and the hounds to allow a slight play of the parts.

The operation of the brake mechanism is as follows:

While the team is exerting any tractive force upon the vehicle the brake-beam will be swung on the staple and kept raised more or less above the reach, in any event sufficiently to remove it out of contact with the wheels.

In descending an inclined plane, the traction force being no longer applied, the weight of the brake-beam suffices to overbalance the double-tree with its connected parts and carry it down into contact with the wheels.

Having thus described my invention,

What I claim as new, and desire to secure by Letters Patent, is—

The brake-beam D, staples E, rods G G, link *c*, and double-tree F, combined and arranged with the hounds, reach, and rear wheels of a vehicle to operate as herein shown and described.

R. C. SHOCKLEY.

Witnesses:
JOSEPH H. CLARY,
F. M. ORTON.